(12) United States Patent
Hasegawa et al.

(10) Patent No.: US 11,261,335 B1
(45) Date of Patent: Mar. 1, 2022

(54) METHODS INVOLVING OXYGEN PLASMA EXPOSURE TO IMPROVE ADHESION OF SILICATE THERMAL COATINGS

(71) Applicant: United States of America as represented by the Administrator of NASA, Washington, DC (US)

(72) Inventors: Mark M. Hasegawa, Highland, MD (US); Kenneth O'Connor, Greenbelt, MD (US); Grace M. Miller, Greenbelt, MD (US); Alfred Wong, Greenbelt, MD (US); George M. Harris, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 16/140,878

(22) Filed: Sep. 25, 2018

(51) Int. Cl.
| | |
|---|---|
| *B05D 3/14* | (2006.01) |
| *C09D 1/00* | (2006.01) |
| *C09D 163/00* | (2006.01) |
| *C09D 5/00* | (2006.01) |
| *B64G 1/58* | (2006.01) |
| *C08J 7/04* | (2020.01) |

(52) U.S. Cl.
CPC .............. *C09D 1/00* (2013.01); *B05D 3/148* (2013.01); *B64G 1/58* (2013.01); *C08J 7/0423* (2020.01); *C09D 5/00* (2013.01); *C09D 5/002* (2013.01); *C09D 163/00* (2013.01); *C08J 2379/08* (2013.01); *C08J 2463/00* (2013.01)

(58) Field of Classification Search
CPC .......... B05D 1/02; B05D 3/142; B05D 3/144; B05D 3/148; C08J 7/045; C08J 7/18; C08J 2463/00–10; C08J 7/0423; C08J 2379/08; B64G 1/58; C09D 5/002; C09D 163/00–10; C09D 1/00; C09D 5/00
USPC ............ 427/534, 535, 536, 538, 539, 421.1, 427/427.4, 427.6, 427.7
See application file for complete search history.

(56) References Cited

U.S. PATENT DOCUMENTS

| | | | | |
|---|---|---|---|---|
| 4,595,623 | A | * | 6/1986 | Du Pont ..................... C08J 9/32 428/195.1 |
| 4,681,718 | A | * | 7/1987 | Oldham .............. B29C 35/0222 264/102 |

(Continued)

OTHER PUBLICATIONS

AZ Technology; Materials, Paint and Coatings: MLP-300-AZ RF transparent primer; copyright 2004; retrieved Dec. 26, 2019 from www.aztechnology.com/materials-coatings-MLP-300-AZ.html; one page.*

(Continued)

*Primary Examiner* — Dah-Wei D. Yuan
*Assistant Examiner* — Nga Leung V Law
(74) *Attorney, Agent, or Firm* — Matthew F. Johnston; Bryan A. Geurts; Helen M. Galus

(57) ABSTRACT

A method of making a thermal control coating is provided. A primer layer can be applied to a substrate to form an exposed surface. The primer layer can include an epoxy binder and a silica filler. The exposed surface can be treated with an oxygen plasma to form a treated surface. A silicate-based thermal control coating can be applied to the treated surface, for example, by spraying, to form a thermal control coating on the substrate. Spacecraft and spacecraft hardware components coated with the thermal control coating, are also provided.

8 Claims, 7 Drawing Sheets

As applied MLP300AZ

After oxygen plasma

(56) References Cited

U.S. PATENT DOCUMENTS

| | | | | |
|---|---|---|---|---|
| 7,851,344 B2* | 12/2010 | Kugler | .................. | B82Y 20/00 |
| | | | | 257/E21.575 |
| 8,765,230 B1* | 7/2014 | Waldrop, III | ............ | H01Q 1/42 |
| | | | | 427/402 |
| 9,435,916 B2* | 9/2016 | David | ................... | G02B 1/118 |
| 10,786,830 B1* | 9/2020 | Straka | ................. | B05D 3/0254 |
| 2007/0066080 A1* | 3/2007 | Kugler | ..................... | C08K 3/36 |
| | | | | 438/725 |
| 2007/0212514 A1* | 9/2007 | Huang | ............... | B01D 67/0044 |
| | | | | 428/98 |
| 2014/0299712 A1* | 10/2014 | Waldrop, III | ............ | H01Q 1/42 |
| | | | | 244/121 |
| 2015/0175807 A1* | 6/2015 | Jing | ....................... | C09D 5/002 |
| | | | | 428/412 |
| 2016/0376450 A1* | 12/2016 | Jung | ................... | C09D 183/08 |
| | | | | 428/148 |

OTHER PUBLICATIONS

AZ Technology; Materials, Paint And Coatings: AZ-93 White Thermal Control, Electrically Conductive Paint/Coating; retrieved Dec. 26, 2019 from www.aztechnology.com/materials-coatings-AZ-93.html; copyright 2004; one page.*

AZ Technology: Spaceflight Systems: Optical Properties Monitoring (OPM)-Science; copyright 2004; retrieved Dec. 26, 2019 from www.aztechnology.com/spaceflight-OPM-science.html; 5 pages.*

AZ Technology; Materials, Paint And Coatings: AZ-2000-IECW White Thermal Control, Electrically Conductive Paint/Coating; retrieved Dec. 26, 2019 from www.aztechnology.com/materials-coatings-AZ-2000-IECW.html; cites a 2008 NASA report, but copyright 2004; 2 pages.*

Tech Briefs, engineering solutions for design & manufacturing; "White, Electrically Conductive, Radiation Stable, Thermal Control Coating"; Goddard Space Flight Center, Greenbelt, Maryland; retrieved from www.techbriefs.com/component/content/article/tb/techbriefs/materials/21767; Apr. 1, 2015; 2 pages.*

M. Kenny et al.; "Further Analysis of Thermal Control Coatings on MISSE for Aerospace Applications"; Jun. 2009; retrieved from //ntrs.nasa.gov/search.jsp?R=20090028808; 25 pages.*

C.A.Cerbus et al.; "Evaluation of Reformulated Thermal Control Coatings in a Simulated Space Environment, Part I.-YB-71"; N95-14063; retrieved from //ntrs.nasa.gov/search.jsp?R=19950007650; appears to be 1995 (no month); pp. 1-23.*

J. Kleiman et al.; black & white thermal control coatings comparison experiment; technical paper; Akhtar; retrieved Dec. 26, 2019 from www.Akhtar.com/about-us/technical-reports/black-white-thermal-control-coatings/; No publication date.*

* cited by examiner

METHODS INVOLVING OXYGEN PLASMA EXPOSURE TO IMPROVE ADHESION OF SILICATE THERMAL COATINGS

STATEMENT OF GOVERNMENT INTEREST

The invention described herein was made at least in part by employees of the United States Government and may be manufactured and used by or for the Government of the United States of America for governmental purposes without the payment of any royalties thereon or therefor.

FIELD OF THE INVENTION

The present invention relates to thermal control coatings for spacecraft and spacecraft hardware.

BACKGROUND OF THE INVENTION

Silicate-based thermal control coatings have been used on spacecraft hardware to protect hardware. Silicate coatings are commonly used in the aerospace industry as thermal control surfaces for radiators and heat rejection systems due to their high solar reflectivity, capability to reject heat, and relative optical stability in a variety of orbital environments. Silicate coatings are difficult to apply. Epoxy binders enable adhesion of silicate coatings to substrates to which they would not normally adhere. Presently, silicate coatings are only used on rigid substrates. Required coating thicknesses vary between different coatings due to the inherent opacity of the pigments used; however, thicker coatings will usually render greater solar reflectance.

As coating thickness grows, interlaminar stress within the coating matrix also grows. When coupled with stresses due to mismatches in coefficients of thermal expansion, the combined effect can exceed the bond strength between the coating and the underlying substrate. When this occurs, the coating can debond, generating large flakes and particle contamination that are detrimental to the performance and longevity of the spacecraft. Therefore, careful control of coating thickness is required and must be balanced against the required thickness to achieve a coating having optimum optical properties. Complex hardware configurations can cause increased coating thickness either due to overspray or surface tension effects, such as corner fillets, and the resulting coating can locally be too thick and cause cracking and spalling.

Current techniques have thickness application limitations. For example, Z93C55 silicate coatings available from Alion Science and Technology Corp. of McLean, Va., can only be applied to near 5 mils or 0.005 inch in thickness. For thickness greater than 0.005-inch structural sturdiness of the coatings is often compromised by excessive interplanar stresses.

SUMMARY OF THE INVENTION

According to various embodiments of the present invention, a method of making a thermal control coating is provided. The method involves applying a primer layer to a substrate. The primer layer can comprise an epoxy binder and a silica filler. Once applied, the primer layer has an exposed surface. The method further involves treating the exposed surface with an oxygen plasma to oxidize the exposed surface. When an epoxy binder is used, the oxygen plasma can oxidize the epoxy binder at the exposed surface. The treatment with oxygen plasma can increase a surface area of the exposed surface, for example, by exposing filler particles at the exposed surface. For example, if a silica filler is used as a component of the primer layer, the oxygen plasma can increase the surface area of silica filler at the exposed surface. The epoxy binder enables adhesion of silicate coatings to substrates to which they would not normally adhere. The silica loaded epoxy improves adhesion to the substrate, but the plasma treatment according to the present invention further improves this adhesion.

Although, heretofore, silicate coatings were only used on rigid substrates, the oxygen plasma treatment of the primer layer increases the adhesion such that silicate coatings can be used on flexible substrates like polyimide films.

Treating the exposed surface results in the formation of a treated surface. The method further involves applying a silicate-based thermal control coating material to the treated surface under conditions such that the silicate-based thermal control coating material chemically bonds to the treated surface. The silicate-based thermal control coating material can be applied by any suitable method, for example, by brushing, spraying, roll coating, casting, or the like. The silicate-based thermal control coating material can be applied by spraying a silicate-based thermal control coating material, for example, to a thickness of from about 0.1 mil to about 20 mils, or from 0.5 mil to 1.5 mils.

The substrate onto which the primer layer can be applied, can comprise a metal material, aluminum, titanium, a metal alloy, a polyimide tape, an adhesive tape, a radiator surface, a panel, a component for a spacecraft, a spacecraft, or the like.

Treating the exposed surface with an oxygen plasma can comprise treating the exposed surface with a glow discharge oxygen plasma. The treatment with the oxygen plasma or glow discharge oxygen plasma can occur in a discharge chamber, for example, in a thin-film deposition chamber.

BRIEF DESCRIPTION OF THE DRAWINGS

The present invention can be even more fully understood with the reference to the accompanying drawings which are intended to illustrate, not limit, the present invention.

DETAILED DESCRIPTION OF THE INVENTION

Figure 1:
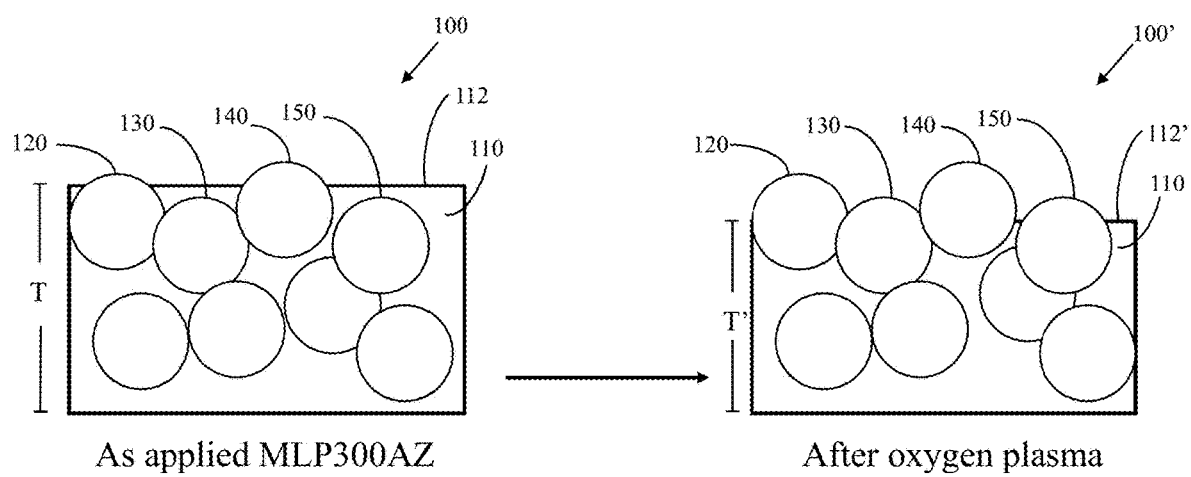
FIG. 1 is a schematic diagram of a before-and-after side view of a silica-filled epoxy primer coating, plasma-treated in accordance with various embodiments of the present invention.

According to the present invention, a method of making a thermal control coating is provided. The method comprises applying a primer layer material to a substrate to form a primer layer. The primer layer material comprises an epoxy binder and a silica filler. The primer layer has an exposed surface. The method also comprises treating the exposed surface with an oxygen plasma to oxidize the epoxy binder at the exposed surface. The treatment increases the surface area of silica filler at the exposed surface and forms a treated surface. A silicate-based thermal control coating material is then applied to the treated surface under conditions such that the silicate-based thermal control coating material chemically bonds to the treated surface and a thermal control coating is formed. Applying the silicate-based thermal control coating material can comprise spraying a silicate-based thermal control coating material or using any other suitable application technique.

The treatment with an oxygen plasma can comprise treating the exposed surface with a glow discharge oxygen plasma. The glow discharge oxygen plasma can be generated in a thin-film glow discharge chamber. The treatment with oxygen plasma can provide a treatment of the exposed surface, with oxygen plasma, for a duration of from about 2 hours to about 6 hours, or for at least one hour.

Applying the silicate-based thermal control coating material can comprise first mixing a conductive component with a silicate-based thermal control coating material. As a result, a conductive coating material is formed that can then be applied as the silicate-based thermal control coating material. The primer layer can comprise the same conductive component that is mixed with the silicate-based thermal control coating material. Instead, the primer layer can be electrically insulative and non-conductive. According to various embodiments, the silicate-based thermal control coating material is electrically conductive and comprises a conductive component, and the primer layer comprises a primer material and from about 1% by weight to about 15% by weight, based on the weight of the primer material, of the same conductive component that is present in the silicate-based thermal control coating material.

The application of the silicate-based thermal control coating material can be controlled to provide a coating thickness of from about 0.1 mil to about 10 mils, for example, from about 0.5 mil to about 1.5 mils. The primer layer can be applied to a thickness of from about 1.0 mil to about 10.0 mils, for example, from about 3.0 mils to about 5.0 mils.

The present invention also provides a coated substrate made by the coating method described herein. The coated substrate can comprise a spacecraft component, for example, spacecraft hardware coated with a silicate-based thermal control coating made by the method described herein. The coated substrate can be a coated high-gain antenna system coated with a silicate-based thermal control coating made by the method described herein.

Applying the silicate-based thermal control coating material can involve first preparing a coating material by mixing a conductive component with a silicate-based thermal control coating material. Adding the conductive component results in the formation of a conductive coating material that can then be applied as the silicate-based thermal control coating material. The primer layer can comprise a different, or the same, conductive component as that which is mixed with the silicate-based thermal control coating material. In some embodiments, the primer layer, the silicate-based thermal control coating material, or both, can be electrically insulative and non-conductive.

The silicate-based thermal control coating material can be electrically conductive and can comprise a conductive component, and the primer layer can also, independently, comprise a conductive component. The primer layer can be loaded, for example, with a conductive component in an amount of from about 1% by weight to about 30% by weight, for example, from about 1% by weight to about 15% by weight, or about 5% by weight, based on the total weight of the primer layer material. The same or a different conductive component can be used in the primer layer material relative to the conductive component used in the silicate-based thermal control coating material.

The method can involve treating the exposed surface with a plasma, for example, an oxygen plasma or a glow discharge oxygen plasma, for a duration of from a few minutes to many hours. The duration can last, for example, from about one hour to about six hours, from about two hours to about five hours, or from about three hours to about four hours.

The primer layer can comprise a binder and a filler, wherein the filler is in the form of particles, spheres, fibers, flakes, rods, a combination thereof, or the like. Silica fibers can be used as the filler.

The present invention also provides spacecraft hardware coated with a silicate-based thermal control coating made by a method described herein. Exemplary spacecraft hardware components include high-gain antennae, other antennae, radiators, solar panels, multi-layer insulative (MLI) blankets, sensors, infra-red sensors, thermal sensors, thermal infra-red sensors, electromagnetic radiation sensors, and the like.

The substrate can comprise a tape, for example, a coated tape such as a coated polyimide tape. The method can further comprise applying the coated tape to spacecraft hardware. Instead of or in addition to a tape, the substrate can comprise an adhesive tape, a film, a thin metal shield, a metal sheet, a foil, a metal foil, a metal substrate, a metal alloy substrate, an aluminum substrate, a titanium substrate, a composite substrate, a carbon fiber substrate, a combination thereof, a blanket, an MLI blanket, or the like.

According to the present invention, a method utilizes oxygen plasma to enhance and improve the adhesion of silicate-based thermal control coatings for use on spacecraft hardware. The oxygen plasma can be used in conjunction with an epoxy-based primer. The useable deposited coating thickness can be extended beyond that of currently used techniques. More material can be safely applied to a radiative surface. The oxygen plasma exposure of these epoxy-based primers enables improved adhesion between the primer and the silicate coating and can extend adhesion strength by levels greater than 40%. For other silicate coatings such as AZ2000, available from AZ Technology Corporation of Huntsville, Ala., the improvement in bond strength allows a coating that is nearly three times as thick as its specification deposition requirements.

An epoxy binder comprising silica filler can be applied, for example, by spraying to form a coating having an exposed surface. The exposed surface can be treated with oxygen plasma to oxidize the exposed surface and scrub-away the epoxy binder material leaving a dense surface area population of exposed silica filler particles and abundant wide-spread attachment sites for binding with a silicate topcoat coating material. There is little or no concern with over-exposure of the oxygen plasma in primer materials producing 50% or greater surface area populations of silica surfaces, for example, taking up 60% of the exposed surface area, 70%, 80%, 90%, 95%, or more. These or other surface area populations of the total surface area of the exposed surface can be made up of silica filler particle surfaces.

The present invention provides higher performance radiator systems, a reduced risk of debonding, and allows for more flexible application techniques, for example, to complex surfaces where thickness control has heretofore been difficult to achieve.

The method of the present invention uses epoxy-based primers and enables silicate systems to bond to non-metallic substrates. The epoxy-based primer can be loaded with silica-containing fillers that enable the silicate coatings to chemically bond to the silica surfaces of the filler. The silicate topcoats do not bond well to the epoxy binder systems, so the proportion of free silica surfaces to epoxy surfaces can be optimized to control the fraction of the area available to achieve a successful topcoat bond while maintaining a strong primer base.

According to the present invention, an epoxy system can be treated, for example, oxidized by exposure to an oxygen plasma, to prepare the exposed surface of the primer for receiving a topcoat. The oxygen plasma can be generated within a thin-film coating chamber. Exposure to the oxygen plasma can be of sufficient duration and intensity to surficially scour the exposed surface of the primer and oxidize the topcoat-facing epoxy. The result is an increased effective surface area for the silicate-based coating to bind to the silica component of the primer. The overall result is an improved adhesive bond strength between the primer and the topcoat that does not impact the ability of the primer to bond, and maintain a bond, to the substrate.

According to the present invention, the method can involve the use of a vacuum plasma process in combination with a spraying method to apply a silicate-based thermal control coating. The method significantly increases the adhesive strength of the applied system and enables more optimum heat rejection performance, reduced particle contamination risk, and improved application complexity and usability.

The epoxy-based primer can comprise a filled primer, for example, filled with silica particles, fibers, combinations thereof, and the like. As an example, MLP300AZ, available from AZ Technology Corporation of Huntsville, Ala., can be used and is a two-part, epoxy-based primer comprising fillers that enable adhesive bonding with silicate systems. While the epoxy component itself is not compatible with silicate binders, it does adhere well to most substrates, including, for example, composites and metals. Systems loaded with silica and micro-balloons that interact with silicate topcoats can be used to form a strong bond to most substrates. The surface of the primer can be rough after curing and silicate can be rub-primed into the primer to enhance bonding. For some systems, such as high-gain antenna systems, rub-priming can be avoided, and the system can instead rely on intimate wetting of the silicate topcoat binder with the filler component of the primer.

The oxygen plasma exposure can be accomplished by glow discharge oxygen plasma, another vacuum oxygen plasma technique, or the like. The treatment scours surfaces of organic components and removes them through oxidation. Epoxy systems including epoxy-based primers are susceptible to this oxidative erosion and the erosion can provide new and enlarged surface areas. The exposure can be of an intensity and duration such that epoxy is removed from the exposed top surface of the primer layer while maintaining protective/bonded epoxy around the filler materials. As a result, more silica filler material is accessible to bind with the silicate topcoat.

By using plasma as a pretreatment, the top-most layer of epoxy can be removed, exposing the additives within the primer coating. This enables a more direct and stronger bond to form between the topcoat and the primer, increasing the overall strength of the coating. A balance must be made, however, between applying too much plasma and applying too little plasma. The amount of plasma treatment applied must not be too little as such would not remove the desired amount of epoxy. Too much plasma treatment would remove too much of the primer coating thus removing too much material and weakening the coating. Too much plasma treatment can also result in UV radiation affecting the interior of the primer and decreasing its structural integrity. Once a good balance in the amount of plasma treatment is found, the results are only beneficial as it will be removing some coating (reducing weight) while increasing bond strength.

The plasma can be applied within a vacuum chamber and can be induced through a large potential charge difference. The vacuum chamber can be prepared by sucking out all the air then replacing it with pure oxygen. The pure oxygen, when excited by the electrical current, becomes oxygen plasma. A standard procedure for application can use large sheets of a black KAPTON® substrate that are coated with the primer then placed in the chamber. Black KAPTON® is available from I.E. du Pont de Nemours and Company, of Wilmington, Del. Most of the sample can begin covered and shielded from the plasma and every two hours a section of covering can be removed to allow for a variance in the amount of plasma exposure. The treatment effectiveness can best be tested after the topcoat has been applied and the coating adhesion strength evaluated. Because of this, evaluation of the plasma treatment can be limited to the methods used to evaluate coatings.

The sample testing can begin with a mandrel bend. The mandrel bend test can involve hanging a fixed weight from one end of the sample and pulling the sample strip around a small metal rod. This bending action causes internal stress within the coating and an outward pulling force. This is then followed by a tape test which involves attempting to remove the coating from the substrate by using a piece of tape. In accordance with the "American Society of Testing and Materials" guidelines, the tape is attached to the surface of the sample then removed after a set time. In order to compare test results, results of the tape test can, for example, be quantified in one of two ways. The coatings performance can be rated on a scale of one to five or the sample can be scanned and analyzed for percent removal.

Samples pretreated with plasma have reliably stronger adhesion and less removal of the topcoat. The amount of plasma exposure can be determined by any suitable method. For example, reflectance measurements can be used to determine the amount of carbon deposited on a mirror, and the mirror can then be exposed to plasma radiation and re-measured. The difference in the two values can be used to calculate an accurate amount of plasma exposure. Instead or in addition, plasma exposure can be measured simply by the number of hours a coating is exposed in the chamber. This method can be effective in comparing the effects of 'more' plasma despite the lack of numerical results.

The silicate coating can comprise Z93C55, Z93P, or the like silicate-based thermal control materials that are compatible for use with MLP300AZ primer on metallic and non-metallic surfaces. Such a system provides improved adhesion especially on flexible substrates, for example, on tapes, films, thin metal shields, and the like. A TIRS-qualified initial primer system can be used in addition to MLP300AZ primer having a 5% by weight AZ2000 loading to provide a conductive coupling between the topcoat and an MLP300AZ-primed substrate that is otherwise insulative in nature (1E14 ohm-cm).

Different pretreatments such as delayed rub-prime and wet sanding can be conducted prior to spraying the topcoat. Flexible samples can be bonded to rigid substrates prior to tape peel testing to enable such testing.

The foregoing systems described are exemplary and other systems can be used. For example, an AZ2000 topcoat can be applied onto a plasma-treated MLP300AZ primer coating containing 5% by weight AZ2000 based on the weight of the MLP300AZ primer coating before any dilution. Such a coating can be used on hardware, and flexible substrates, for example, on spacecraft or on hardware intended to be used on spacecraft. The MLP300AZ primer coating, with or without an added conductive component such as AZ2000, can be used on aluminum substrates, titanium substrates, other metal substrates, alloys thereof, and the like. The coating system can be applied to a tape, a pressure sensitive adhesive tape, a polyimide tape, an adhesive polyimide tape such as KAPTON® tape, an Al-NEPTAPE®, a combination thereof, or the like.

The primer coating can be a diluted product from a commercially available coating material. The percent by weight of additives such as conductive components can be based on the weight of the commercially available, undiluted form of the coating material. On this basis, a conductive component or other additive can be added to the coating material in an amount of from about 0.1 to about 30% by weight, for example, from about 1.0% by weight to about 10.0% by weight, or from 2.0% to about 6.0% by weight.

FIG. 1 is a schematic diagram of a side view of an oxide-filled epoxy primer coating before and after a plasma treatment. In FIG. 1, the primer coating exemplified is MLP300AZ. As illustrated, before an oxygen plasma treatment, and as shown on the left side of FIG. 1, a primer coating 100 is shown and comprises an epoxy binder 110 and a plurality of silica and metal oxide filler particles 120, 130, 140, and 150. Each of the filler particles is partially or fully encapsulated by binder 110. An exposed top surface 112 of primer coating 100 primarily presents an epoxy binder surface with small exposed areas made up of filler particles, for example, particles 120 and 140 protruding from the portion of top surface 112 that is made only of epoxy binder. As illustrated, silica filler particles 130 and 150 are not exposed at surface 112 of primer coating 100 before the oxygen plasma treatment.

The thickness T of the primer coating can be defined by the portion of the exposed top surface 112 comprising only epoxy binder. Thickness T is reduced to a thickness T', defined by a plasma-treated surface 112', after plasma treatment. As can be seen in the right side of FIG. 1, after the oxygen plasma treatment each of filler particles 120, 130, 140, and 150 is exposed at plasma-treated surface 112' of treated coating 100'. Furthermore, after oxygen plasma treatment, it can be seen that major portions of filler particles 120 and 140 are now exposed, after the oxygen plasma treatment, greatly increasing the total area of material on the surface which is compatible and available for chemical bonding with a silicate topcoat material. The epoxy binder can have silica of various forms, as well as metal oxides as filler material. MLP300AZ has silica of various forms, as well as metal oxides as filler material. The silicate coatings are able to adhere to both the silica and the metal oxides.

As can be seen from the illustration, as more and more epoxy binder is oxidized the exposed surface becomes more and more populated with exposed filler particle surfaces that are not oxidized by the plasma. In fact, the increased surface area of oxide surfaces can actually prevent further epoxy binder oxidation by shielding the epoxy binder from the plasma. Accordingly, in some embodiments, prolong exposure to plasma can be used to treat the exposed surface without concern for over-treating the exposed surface. For example, exposure for periods of one hour or longer, two hours or longer, three hours or longer, four hours or longer, or six hours or longer can be used.

EXAMPLES

Various systems were tested, including oxygen plasma-treated epoxy-based primers, to evaluate adhesion on flexible films including Black KAPTON® and Al-NEPTAPE®. MLP300AZ-based primers were applied to the films and cured. Oxygen plasma treatment was then carried out for between 0 and 6 hours. Z93C55/Z93P topcoats were then applied to thicknesses of between 4 and 12 mils. The flexible, film substrates enabled mandrel bend tests and tape tests for a definitive, quantitative measure of adhesion to the substrates. The tests included a reverse bend test around a 3/16" diameter mandrel using a 20-gram loading. Tape peel tests were conducted using higher tack tape, in particular, 396 Superbond tape (140 oz/inch) available from Minnesota Mining and Manufacturing (3M) Company, Saint Paul, Minn. Normal QC tape tests were conducted using 3M250 tape (78 oz/inch), also available from 3M Company. The purpose of the tests was to evaluate adhesion failure of the topcoat, i.e., of the silicate-based coating. The percentage of the coating area removed was read using image analysis software. Rapid Vacuum Thermal Cycling was carried out on the composite samples. The temperature was cycled from 165° C. to 130° C. for 2100 cycles, at 47 minutes per cycle.

Oxygen plasma created by glow discharge improved the adhesion of Z93C55 and Z93P to MLP300AZ primers. Systems with oxygen plasma treated primers have passed life testing (2000+ cycles), significantly beyond standard Goddard Space Flight Center (GSFC) coating qualifications. Issues dealing with adhesion of silicates to the primer were improved with the use of plasma pretreatment at or near 6 hours in a B4/195 72-inch chamber.

The substrate used in the Examples was black KAPTON®. Black KAPTON® is a very flimsy, thin-film, polyimide film that presents a difficult substrate to work with, particularly because of the ease with which coatings formed on top thereof can flake-off. To roughen the KAPTON®, a piece of Scotch-Brite was rubbed over the entire surface. It was then cleaned with isopropyl alcohol (IPA) and sprayed with MLP 300. Thickness measurements were taken using a TX1 machine and then the samples were cured at 212° F. for 48 hours. Ten samples were set aside, and 14 were exposed to plasma for 4 hours. All 24 samples were burnished with the Z93C55 via either rub-priming or wet sanding. The top coat, a common silicate coating (Z93C55), was sprayed due to its high usage and tendency to flake more often than other coatings. Half of the samples were sprayed to a 4-mil thickness and the other half of the samples were sprayed to a 6-mil thickness. Thicknesses measurements were again taken with the TX1 machine. After curing for one week, the samples were cut into 216 pieces and labeled. They were then subjected to the Mandrel Bend Test and the Tape Lift Test and given a score of from 1-5 (adapted from ASTM International Tape Test standards) based on their results.

To carry out the mandrel bend test, gloves were worn, and a small aluminum sheet was cleaned using a Kimtex wipe and isopropyl alcohol, then dried. The sheet was then carefully unrolled over the sheet with the edges lining up. The tape was applied by pressing evenly down on one end and slowly pressing the tape down to avoid air bubbles. The top plastic sheet of the tape was then lifted exposing the adhesive aluminum underneath. The adhesive was transferred by running a roller over the entire surface. The mandrel was then cleaned with a wipe and alcohol. A first sample (Sample 1A) was taken out of its bag and the binder clip was clamped onto the end most section of the sample on the end with the tape label. The sample was then held by the very end of the opposite side and pulled around the mandrel at a constant rate over the course of 1-2 seconds with the weight from the clip pulling on the other end. When the binder clip reached the mandrel, the sample was held out again as the binder clip was removed. The sample was rated on a scale of 1 to 5 for the amount of cracking/removal that took place, and the rating was recorded. A sample that shattered would receive a 1 while a coating that had no visible or audible cracking would receive a 5. The sample was held taught and laid down on the sticky aluminum. This process was repeated for the rest of the samples from a numbered set. When all strips from the set were tested a photograph was taken then the plastic part of the adhesive tape was laid back down over top of them and the roller was run over each piece 4 times to ensure adhesion. The plastic part of the tape was then removed and discarded.

For the tape test, a section of SuperBond was cut to a length that would allow the top to be folded over on itself while still allowing for enough tape to cover the entire sample (about 5 inches long with the top ½" folded back down). The tape was laid down over the first sample on the board and the time was noted. An eraser was run over the entire strip to ensure adhesion and 60 seconds later the tape was removed by pulling back at a 180-degree angle at a constant rate. The removed tape was placed on a sheet protector and labeled in the same way as the sample strip. The sample was then rated 1 to 5 on how much coating was removed, 5 meaning no removal and 1 meaning total removal. The rest of the sample set was tested in this manner and a picture was taken of the sheet with the samples afterwards. The entire test procedure was repeated in the same way for all other sample sets. The results are shown in Table 1.

Mandrel Bend Test Scores

5: No coating lost, some small cracks
4: 0-4% coating lost, some flaking.
3: Small flakes affecting 5-35%.
2: Significant flaking affecting 36-65%.
1: More than 65% of coating has come off.

Tape Lift Test Scores

5: No peeling or coating removal.
4. Small or trace peeling or flaking, less than 5%.
3: 5-35% coating lost, significant flaking.
2: 36-65% coating lost.
1: More than 65% coating lost

TABLE 1

| BASIC AVERAGES | | | |
|---|---|---|---|
| 7 mils: | Mandrel Bend Test | Tape Lift Test | Population |
| 0 hours | 2.9 | 1.7 | 44 |
| 1 hours | 3.4 | 2.7 | 18 |
| 2 hours | 4.6 | 3.7 | 9 |
| 4 hours | 4.1 | 2.9 | 36 |
| All Plasma | 4.0 | 3.1 | 63 |
| No Plasma | 2.9 | 1.7 | 44 |

*4 hours is 42% better than 0 hours  *4 hours is 45% better than 0 hours
*Plasma is 39% better than none  *Plasma is 54% better than none

| 4 mils: | Mandrel Bend Test | Tape Lift Test | Population |
|---|---|---|---|
| 0 hours | 4.9 | 4.0 | 45 |
| 1 hour | N/A | N/A | 0 |
| 2 hours | N/A | N/A | 0 |
| 4 hours | 4.9 | 4.4 | 63 |
| All Plasma | 4.9 | 4.4 | 63 |
| No Plasma | 4.9 | 4.0 | 45 |

*4 hours is 1% better than 0 hours  *4 hours is 9% better than 0 hours

| Totals: | Mandrel Bend Test | Tape Lift Test | Population |
|---|---|---|---|
| 0 hours | 3.8 | 2.9 | 89 |
| 1 hour | 3.4 | 2.7 | 18 |
| 2 hours | 4.6 | 3.7 | 9 |
| 4 hours | 4.9 | 3.8 | 100 |
| All Plasma | 4.0 | 3.2 | 127 |
| No Plasma | 3.8 | 2.9 | 89 |

*4 hours is 20% better than 0 hours  *4 hours is 33% better than 0 hours
*Plasma is 12% better than no plasma *Plasma is 10% better than no plasma The data shows that oxygen plasma exposure to an MLP 300 and black KAPTON® substrate is beneficial for improving the adhesive properties of the Z93C55 coatings. With regard to the thinner coatings, the different methods of surface preparation held less significance, but in the coatings that were about 7 mils thick, the samples that received plasma performed significantly better in both the tape test and the mandrel bend test. Considering a score of 3 would be passing, the plasma elevated the average of all samples on the tape lift test from a failing grade to a passing grade. In this experiment, 215 samples were tested.

Figure 2:
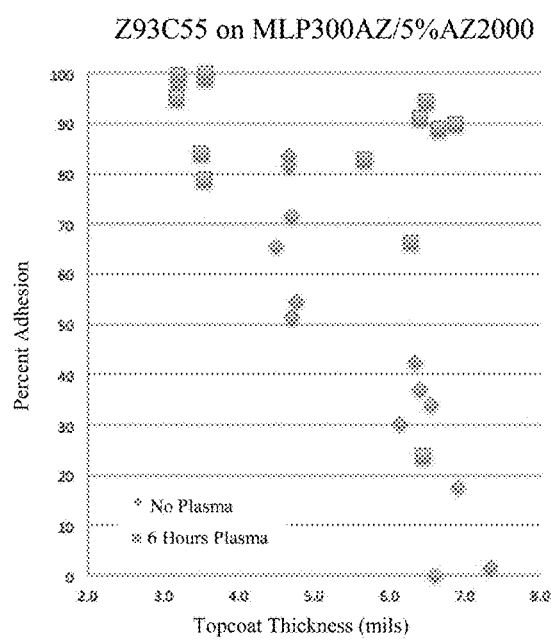
FIG. 2 is a graph of percent adhesion versus topcoat thickness and comparing untreated samples with plasma-treated samples.
Figure 3:
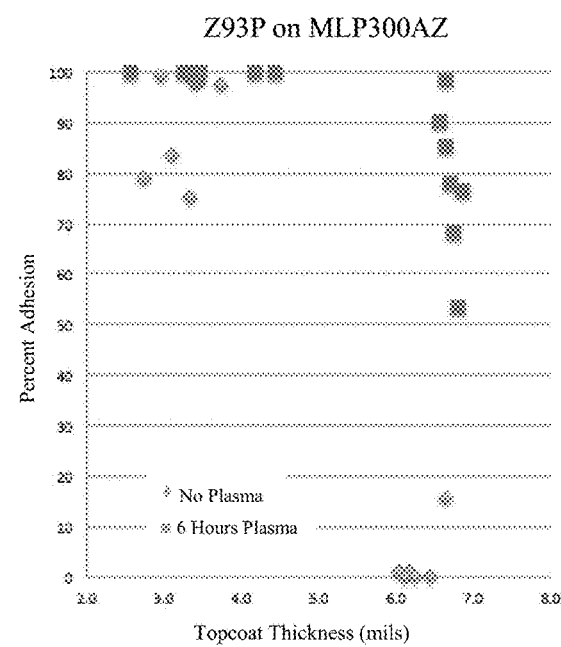
FIG. 3 is a graph of percent adhesion versus topcoat thickness and comparing untreated samples with plasma-treated samples.
Figure 4:
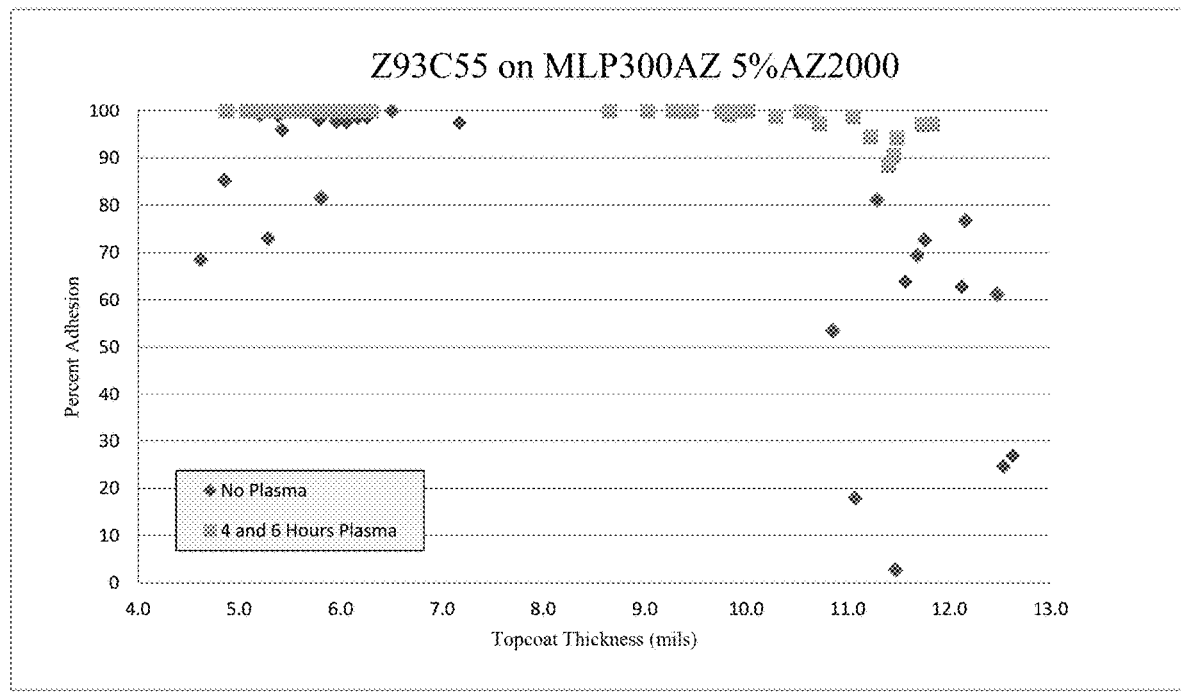
FIG. 4 is a graph of percent adhesion versus topcoat thickness and comparing untreated samples with plasma-treated samples.
Figure 5:
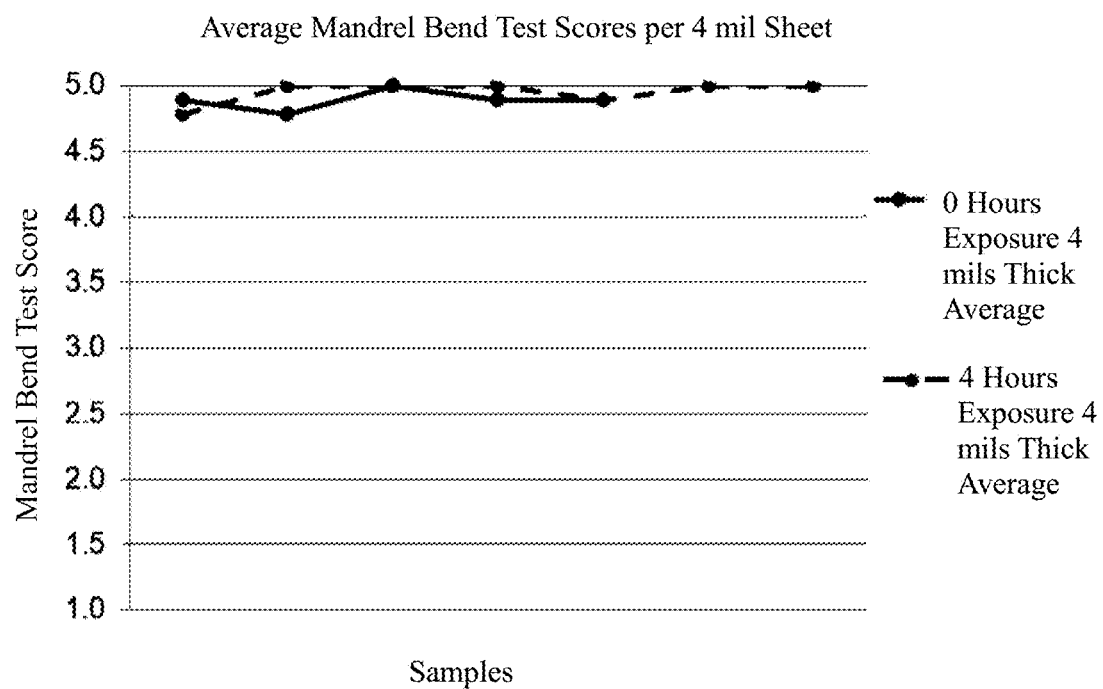
FIG. 5 is a graph of mandrel bend test scores for 4 mil-thick samples that have been exposed to four hours of plasma treatment, compared with mandrel bend test scores for 4 mil-thick samples that have not been exposed to a plasma treatment.
Figure 6:
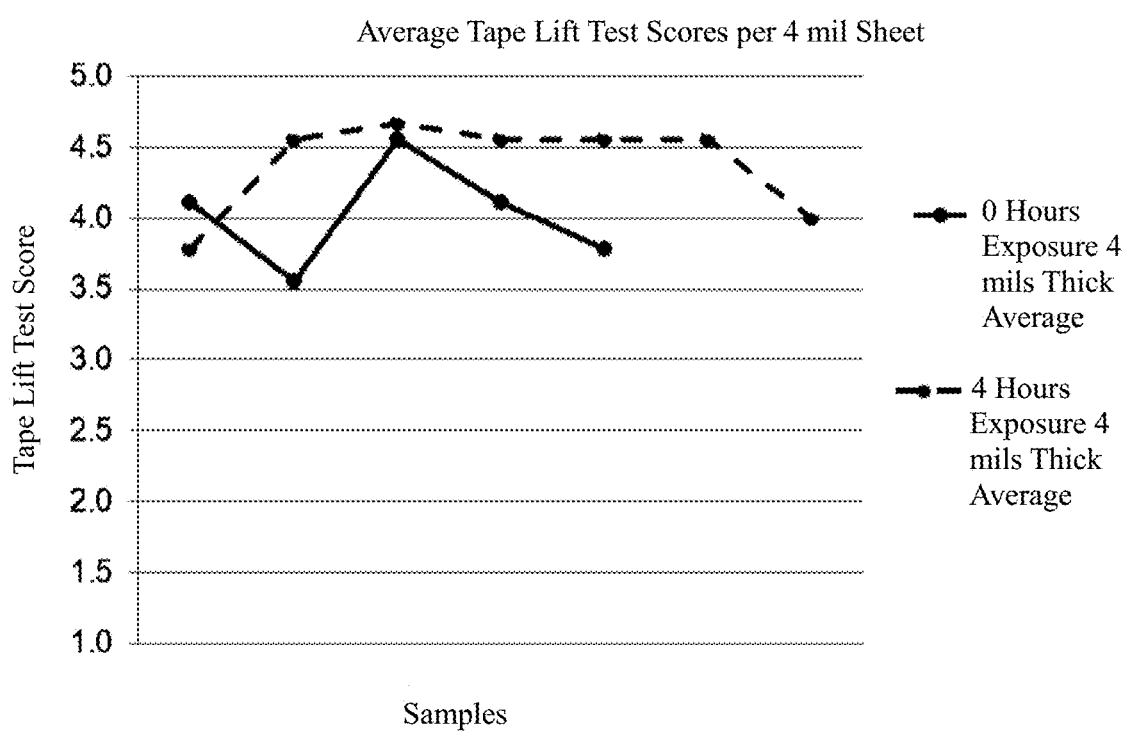
FIG. 6 is a graph of tape lift test scores for 4 mil-thick samples that have been exposed to four hours of plasma treatment, compared with tape lift test scores for 4 mil-thick samples that have not been exposed to a plasma treatment
Figure 7:
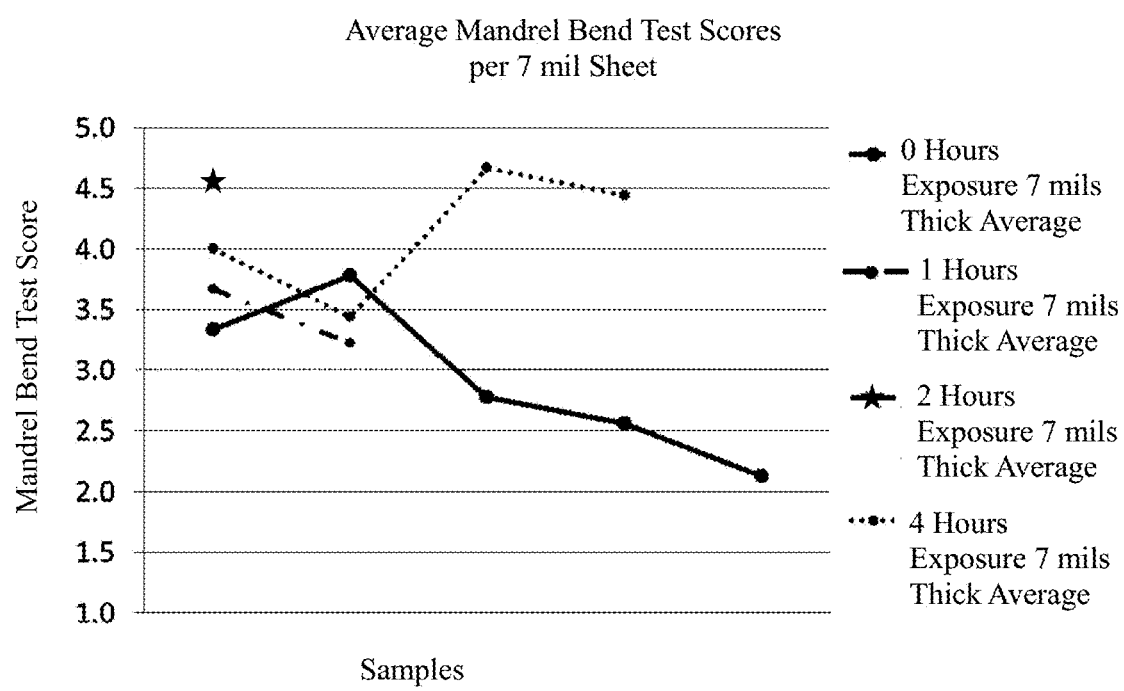
FIG. 7 is a graph showing mandrel bend test scores for 7 mil-thick samples that have been exposed to different durations of plasma treatment or no plasma treatment at all.
Figure 8:
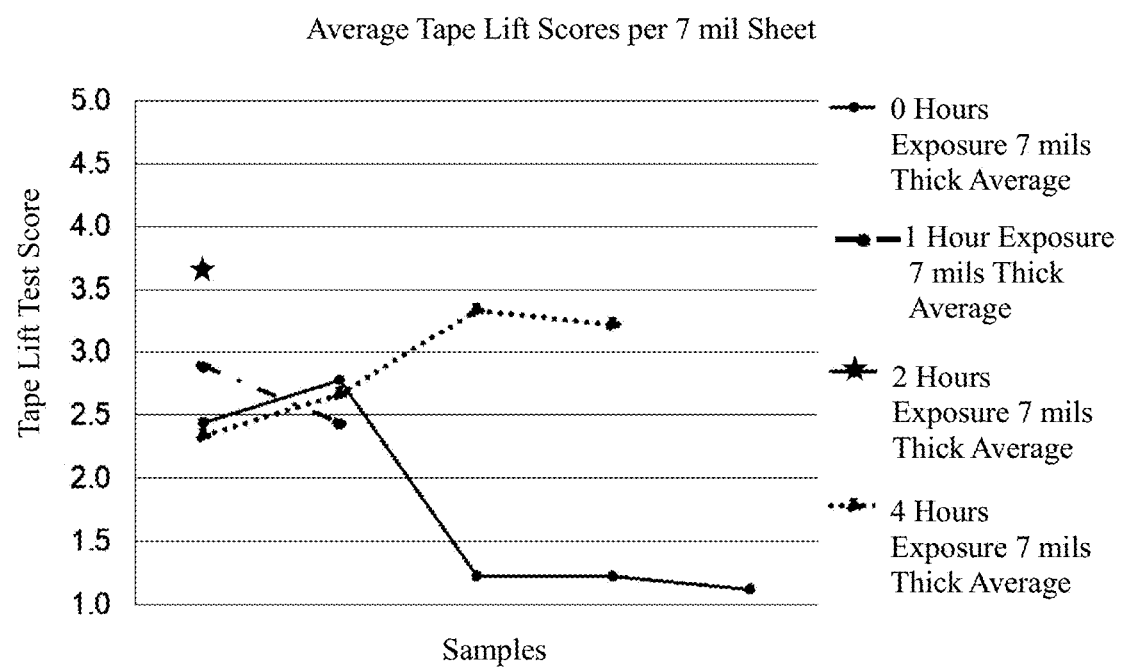
FIG. 8 is a graph showing tape lift test scores for 7 mil-thick samples that have been exposed to different durations of plasma treatment or no plasma treatment at all.

Each of FIGS. 2-4 shows that the plasma-treated samples had higher percent adhesion compared with the untreated samples. FIGS. 5-8 show that the plasma-treated samples provide better test scores, in general, in mandrel bend tests and tape lift tests.

The entire contents of all references cited in this disclosure are incorporated herein in their entireties, by reference. Herein, the term "about" means within a range of from plus 5% to minus 5% the value modified. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method of making a thermal control coating, comprising steps of:
   applying a primer layer to a substrate, the primer layer comprising an epoxy binder and a silica filler, the primer layer having an exposed surface;
   treating the exposed surface with an oxygen plasma by treating said exposed surface with a glow discharge oxygen plasma in a glow discharge chamber for at least two hours to oxidize the epoxy binder at the exposed surface to thereby increase a surface area of said silica filler at the exposed surface to at least 50% thereof to form a treated surface; and
   spraying a silicate-based thermal control coating material on the treated surface under conditions such that the silicate-based thermal control coating material chemically bonds to the treated surface and said thermal control coating is formed; and
   wherein said step of treating the exposed surface with said oxygen plasma improves an adhesive bond strength between the primer layer and the silicate-based thermal control coating and does not impact the primer layer maintaining a bond to said substrate and thereby creating a spacecraft hardware thermal control coating.

2. The method of claim 1, wherein the substrate comprises a polyimide tape.

3. The method of claim 1, wherein the substrate is a flexible tape.

4. A method of making a thermal control coating, comprising steps of:
   Applying a primer layer to a substrate, the primer layer comprising an epoxy binder and a silica filter, the primer layer having an exposed surface;
   treating the exposed surface with an oxygen plasma by treating said exposed surface with a glow discharge oxygen plasma in a glow discharge chamber for at least two hours to oxidize the epoxy binder at the exposed surface to thereby increase a surface area of said silica filler at the exposed surface to at least 50% thereof to form a treated surface; and
   spraying a silicate-based thermal control coating material on the treated surface under conditions such that the silicate-based thermal control coating material chemically bonds to the treated surface and said thermal control coating formed; and
   wherein said step of treating the exposed surface with said oxygen plasma improves an adhesive bond strength between the primer layer and the silicate-based thermal control coating and does not impact the primer layer maintaining a bond to said substrate and thereby creating a spacecraft hardware thermal control coating; and
   wherein the apply the silicate-based thermal control coating material comprises first mixing electrically conductive component with said silicate-based thermal control coating material to form a conductive coating material that is then applied as the silicate-based thermal control coating material; and
   wherein the method of making said thermal control coating first comprises a step of mixing more of the same electrically conductive component that is mixed with the silicate-based thermal control coating material with said epoxy binder and a silica filler before said step of applying said primer layer to said substrate.

5. The method of claim 1, wherein the primer layer is electrically insulative and non-conductive.

6. The method of claim 1, wherein the silicate-based thermal control coating material is applied to a thickness of from about 0.1 mil to about 20 mils.

7. The method of claim 1, wherein the silicate-based thermal control coating material is applied to a thickness of from about 0.5 mil to about 1.5 mils.

8. The method claim 1, wherein the primer layer is applied to a thickness of from about 3.0 to about 5.0 mils.

* * * * *